(12) United States Patent
Lins et al.

(10) Patent No.: US 8,188,175 B2
(45) Date of Patent: May 29, 2012

(54) WOOD SUBSTITUTE MATERIAL AND ITS USE

(75) Inventors: Nikolas Lins, Schweig Behringersdorf (DE); Sylvia Diestel, Alt-Mölln (DE); Andreas Thies, Effeltrich (DE)

(73) Assignee: J.S. Staedtler GmbH & Co. KG, Nuremberg (DE)

( * ) Notice: Subject to any disclaimer, the term of this patent is extended or adjusted under 35 U.S.C. 154(b) by 0 days.

(21) Appl. No.: 13/054,054

(22) PCT Filed: Jul. 11, 2009

(86) PCT No.: PCT/EP2009/005051
§ 371 (c)(1),
(2), (4) Date: Feb. 14, 2011

(87) PCT Pub. No.: WO2010/006743
PCT Pub. Date: Jan. 21, 2010

(65) Prior Publication Data
US 2011/0172332 A1 Jul. 14, 2011

(30) Foreign Application Priority Data
Jul. 15, 2008 (DE) .......................... 10 2008 034 013

(51) Int. Cl.
*C08L 91/06* (2006.01)
(52) U.S. Cl. .............. 524/275; 524/13; 524/35; 524/80; 524/277

(58) Field of Classification Search .................... 524/13, 524/35, 80, 275, 277
See application file for complete search history.

(56) References Cited

U.S. PATENT DOCUMENTS
2007/0027234 A1* 2/2007 Sigworth et al. ................ 524/13
2010/0003061 A1* 1/2010 Andreas .......................... 401/88

FOREIGN PATENT DOCUMENTS
| DE | 19855325 A | 6/1999 |
| DE | 102006046491 X | 4/2008 |
| DE | 202007017569 A | 4/2008 |
| WO | WO 2008/040449 A2 * | 4/2008 |

* cited by examiner

*Primary Examiner* — Ling-Siu Choi
(74) *Attorney, Agent, or Firm* — Lucas & Mercanti, LLP; Klaus P. Stoffel

(57) ABSTRACT

The invention relates to a wood substitute material for wood-encased pencils, comprising the following ingredients: 15-3.0% by weight of at least one polymeric binder, 50-80% by weight of at least one organic filler, 0-20% by weight of at least one inorganic filler, 0.5-5% by weight of at least one adhesion promoter, 1-30% by weight of at least one wax, 0-10% by weight of at least one color pigment, and 0-10% by weight of at least one additive, the at least one adhesion promoter forming a chemical bond between the at least one polymeric binder and the at least one organic filler, a ratio of the at least one adhesion promoter and the at least one wax in the range from 1:2 to 1:6 being formed, and the sum of organic and inorganic filler being not more than 80% by weight.

22 Claims, 2 Drawing Sheets

WOOD SUBSTITUTE MATERIAL AND ITS USE

The present application is a 371 of International application PCT/EP2009/005051 filed Jul 11, 2009, which claims priority of DE 10 2008 034 013.8, filed Jul 15, 2008, the priority of these applications is hereby claimed and these applications are incorporated herein by reference.

BACKGROUND OF THE INVENTION

The invention relates to a wood substitute material for wood-encased pencils, such as lead pencils, colour pencils or cosmetic pencils with colour-releasing leads as well as various other types of pencils with leads made, for example of eraser material, etc., as well as to the use thereof.

The wood of the pencil enveloping the lead is replaced by the wood substitute material.

Wood-encased pencils in which the lead is surrounded or sheathed by naturally grown wood have long been known. In recent years the price of quality high-grade woods has increased owing to the lack of availability of wood, which has a direct effect on pencil production costs. In addition, comparatively large natural woods deposits are being consumed for the production of pencils.

For this reason it has already been attempted for years in the field of other trades to replace natural woods with wood substitute materials that are more cost effective and preserve the natural appearance of wood.

One type of wood substitute materials are 'wood plastic composites', which are thermoplastically processable materials with different fractions of wood, plastics materials and additives and are processed by thermoplastic forming processes, such as extrusion, injection moulding or pressing.

The additives optimise the performance characteristics required for the respective intended use and influence them considerably. For example adhesion promoters for improving the wood-plastic bond, waxes for ensuring processability, pigments for creating colour and means for ensuring the UV-, weather-, insect- and fungus-resistance are thus used.

Fields of application include, inter alia, patio floorings, plant boxes, claddings, ground surfaces, furniture or internal fittings in the automobile industry.

In addition to other properties, the wood substitute materials currently available on the market have been optimised in such a way that they exhibit the highest possible strength properties, such as bending strength or abrasion resistance.

However, wood substitute materials of this type are not suitable for the replacement of wood in wood-encased pencils, or are only suitable to a limited extent since pencils of this type either cannot be sharpened with a commercial conventional hand-held sharpener or else only with difficulty.

Foamed plastics materials or inorganically filled plastics materials are also known that act as wood substitute materials.

Foamed plastics materials have a low modulus of elasticity and are therefore normally very resilient. Owing to this high resiliency foamed plastics materials are les suitable as wood substitute materials for pencils since, with a resilient enveloping of a conventional lead, the necessary supporting effect for the lead is lacking and the lead may break when the pencil is used. Although this can be prevented by a correspondingly resilient configuration of the lead, the lead then exhibits poorer writing properties however.

SUMMARY OF THE INVENTION

The object of the invention is therefore to provide a wood substitute material that can be sharpened and is suitable for enveloping the lead of a pencil instead of natural wood.

The wood substitute material according to the invention is formed of the following ingredients:

15-30% by weight of at least one polymeric binder,
50-80% by weight of at least one organic filler
0-20% by weight of at least one inorganic filler
0.5-5% by weight of at least one adhesion promoter
1-30% by weight of at least one wax
0-10% by weight of at least one colour pigment, and
0-10% by weight of at least one additive, the at least one adhesion promoter forming a chemical bond between the at least one polymeric binder and the at least one organic filler, a ratio of the at least one adhesion promoter to the at least one wax in the range from 1:2 to 1:6 being formed, and the sum of organic and inorganic filler being not more than 80% by weight.

A combination of this type of waxes and adhesion promoters results in a wood substitute material that can be sharpened and, in particular, can replace natural wood in wood-encased pencils to envelope the lead. This is not the case with the known wood substitute materials according to the prior art. The special feature of the wood substitute material according to the invention lies in the fact that pencils formed with it, in which the lead is enveloped by the wood substitute material instead of wood, exhibit all the usual properties of known wood-encased pencils.

The mentioned combination of raw materials therefore results in a material that is suitable to a specific extent for the production of lead holders or casings that can be sharpened, forming writing tools and/or cosmetic pencils.

The wood substitute material according to the invention is therefore particularly suitable as a casing for leads for the production of pencils since a pencil formed with it can be sharpened using a commercial conventional hand-held sharpener with little expenditure of force and the pencil simultaneously exhibits the required bending strength for use as a writing tool. In addition, the wood substitute material has a comparatively high modulus of elasticity so both poorly resilient and resilient leads can be enveloped.

In order to assess the sharpenability of the wood substitute material and its suitability for the production of pencils, solid bodies were produced with it and these were sharpened. The use of a wood substitute material that has been judged to be suitable for sharpening results in the fact that a pencil produced with it can be sharpened with low expenditure of force. In this instance a pencil and, in particular, a wood substitute material that has a 'sharpening moment' of less than 10 Ncm during testing or sharpening is classed as being sharpenable with low expenditure of energy. The sharpening moment is determined in a testing machine developed for this purpose, in which a test sample in the form of a pencil or a solid body made of the wood substitute material is sharpened continuously for 20 s. The sharpening moment is deemed to be the average torque (in Ncm), ascertained during the sharpening process, needed to continuously sharpen a test sample with a diameter of 7.6±0.2 mm at a speed of 43 rpm with a conical point already provided, i.e. already pointed at the desired angle, in a commercial conventional sharpener with a new blade.

DETAILED DESCRIPTION OF THE INVENTION

Figure 1:
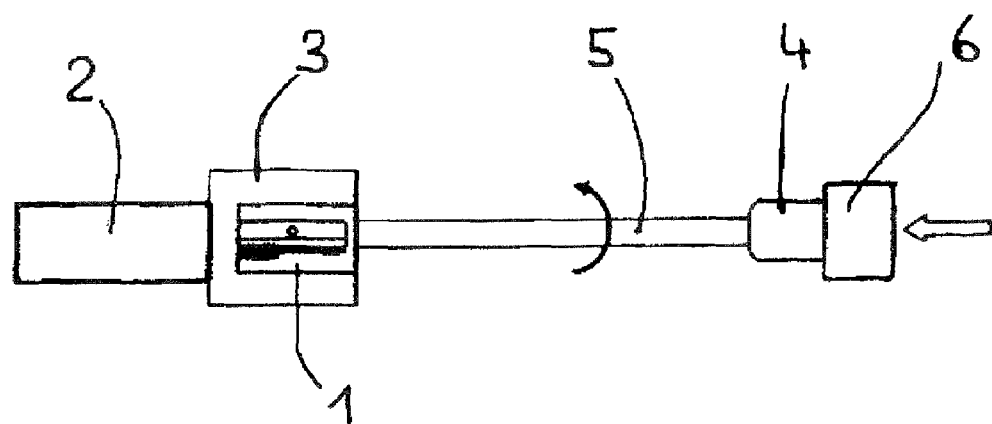
FIG. 1 schematically illustrates a device for measuring the sharpening moment.

The principle of a device for measuring the sharpening moment is illustrated in FIG. 1 for explanatory purposes. A sharpener 1 is fixed in a holder 3 connected to a torque measuring device 2. A test sample 5 is provided in a rotatable seat 4 and placed in the sharpener 1. The rotating test sample 5 is fed pneumatically in the direction of the sharpener 1 using a feed device 6 that exerts a feed force of 20 N on the seat 4 of the test sample 5 (see the arrow to the right in the figure). The torque measured by the torque measuring device 2 during sharpening of the test sample 5 is indicated and averaged over the test period in order to determine the sharpening moment.

The bending strength of the wood substitute material desired for use a casing for pencil leads is particularly at least 50 MPa. The modulus of elasticity is preferably at least 5000 MPa. The bending strength and modulus of elasticity are determined in a 3-point bending test in accordance with DIN 52186 (testing of wood; bending test).

Figure 2:
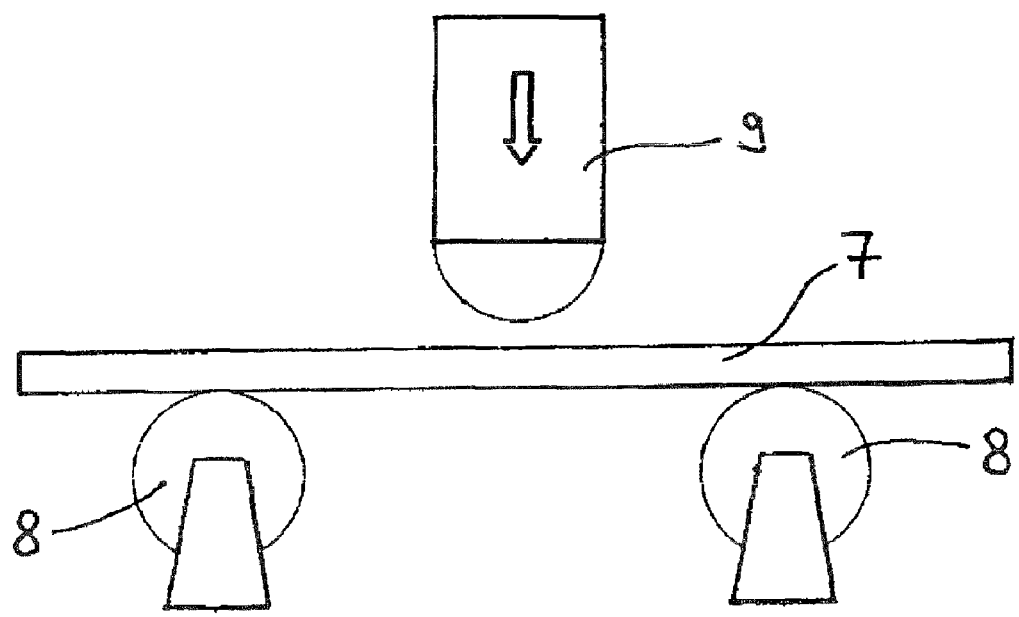
FIG. 2 schematically illustrates a bending measurement test.

FIG. 2 illustrates a measuring device for carrying out a 3-point bending test of this type. Cylindrical test samples 7 in the form of pencils or solid bodies made of wood substitute material with a diameter of 7.6±0.2 mm and a length of 180±5 mm are used. The test sample 7 is mounted on movable rollers 8 with a bearing span of 100 mm (distance between the centre points of the rollers 8). Force is introduced centrally with a test plunger 9. The rollers 8 and the test plunger 9 have a radius of 15 mm. The test sample 7 is loaded uniformly during testing until the test sample 7 breaks. The bending strength and modulus of elasticity of the test sample 7 are determined from the necessary breaking force and the measured deflection of the test sample 7 under increasing load.

Advantageous configurations of the wood substitute material according to the invention will be explained hereinafter.

With regard to strength and sharpenability, the wood substitute material is particularly advantageous when the ratio between the at least one adhesion promoter and the at least one wax is formed in the range from 1:2.5 to 1:4.5.

Furthermore, it has also been found that particularly good properties with regard to sharpenability, strength and processability are produced with the following composition containing:

20-25% by weight of at least one polymeric binder,
65-75% by weight of at least one organic filler
1-5% by weight of at least one inorganic filler
1-2% by weight of at least one adhesion promoter
2-12% by weight of at least one wax
1-4% by weight of at least one colour pigment, and
0-5% by weight of at least one additive.

For sharpenability it is advantageous if the at least one wax is selected from the group of waxes comprising amide waxes, fatty acids such as stearic acid and palmitic acid, montanic wax, stearates, fatty acid esters and paraffin wax.

For sharpenability it is particularly advantageous for the at least one wax to be formed of amide wax and/or stearic acid.

For sharpenability it is most advantageous for the at least one wax to be formed of a combination of amide wax and stearic acid, a ratio of amide wax to stearic acid lying in the range from 1:0.5 to 1:2.

Wood substitute materials are compared with materials according to the prior art in the table below in order to better understand the invention. The test samples used for comparison exhibit the same cross-sectional geometry and have a diameter of 7.6±0.2 mm.

|  | Natural wood | Unfoamed wood substitute materials (prior art) | Wood substitute material (according to the invention) |
|---|---|---|---|
| Sharpening moment Ncm | 7 to 12 | >14 | ≦10 |

For reasons of profitability and good availability, it is advantageous for the at least one polymeric binder to be selected from the group of polyolefins.

In order for the wood substitute material to achieve a character similar to wood, it is advantageous for the at least one organic filler to be formed of wood and/or cellulose.

An adhesion promoter is necessary for the bonding of wood that has a polar surface and a polymeric binder that has a non-polar surface, for example polyolefins. Since adhesion promoters for polyethylene (PE) and polypropylene (PP) are available on the market, it is advantageous for the at least one polymeric binder to be formed of polyethylene (PE) and/or polypropylene (PP).

An adhesion promoter that is formed by a polyethylene (PE) with grafted maleic anhydride has proven to be effective for bonding wood and PE.

It is particularly advantageous for the at least one polymeric binder to be formed of polyethylene high-density (PEHD) in order to achieve a bending strength of more than 50 MPa and a modulus of elasticity of more than 5000 MPa.

Figure 3:
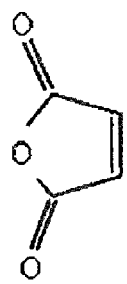
FIG. 3 schematically illustrates operation of the adhesion promoter.
Figure 3:
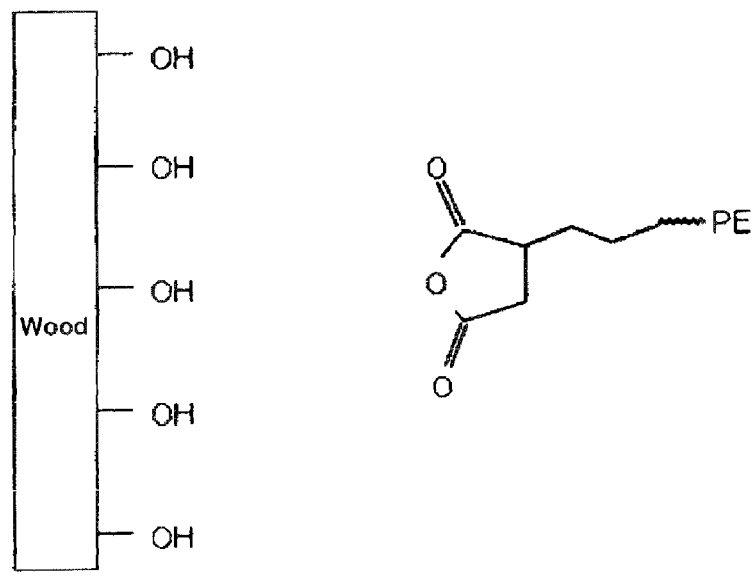
Figure 3:
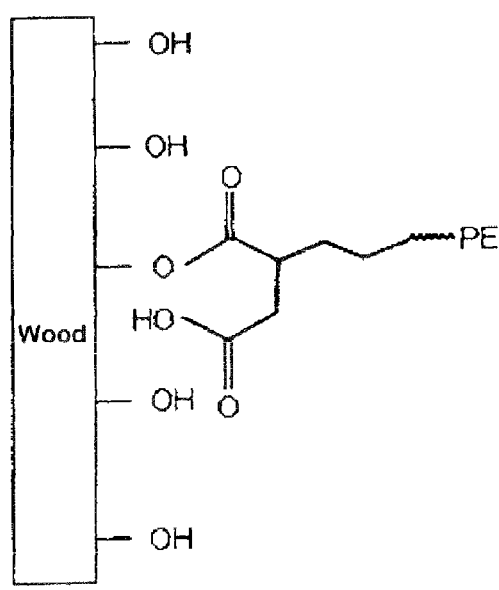

FIG. 3 schematically illustrates the operating principle of the adhesion promoter for the combination of wood and PE.

The upper part of FIG. 3 shows the basic structure of a maleic acid molecule. The centre of the figure illustrates wood with its polar surface in the form of hydroxy groups as well as an adhesion promoter molecule present in the form of a modified maleic anhydride molecule with grafted PE that approximates the wood surface. In this context and example 'modified' means that the polyethylene (PE) is grafted onto maleic acid.

The lower part of FIG. 3 illustrates the connection of the modified maleic anhydride molecule to the polar surface of the wood. The grafted PE of the adhesion promoter then couples to the polymeric binder in the form of PE in such a way that a good adhesive bond is achieved between the wood and the PE.

It has furthermore proven advantageous for the at least one adhesion promoter to be formed by an ethylene-maleic anhydride copolymer (with maleic anhydride-grafted metallocene polyethylene wax).

As already mentioned above, in order for the wood substitute material to obtain a character similar to wood it is preferred for the at least one organic filler to be formed of wood and/or cellulose.

For sharpenability it is particularly advantageous for the at least one organic filler to be formed of filler particles having a maximum particle size of 250 μm, in particular a maximum of 100 μm.

In order to lighten the hue of the wood substitute material it has proven effective for the wood substitute material to contain 1 to 3% by weight of white colour pigment.

In order to lighten the hue it has proven to be advantageous for the white colour pigment to be formed of titanium oxide ($TiO_2$).

In order to adjust the desired hue it is advantageous for the wood substitute material to contain 0.1 to 5% by weight of coloured colour pigment.

In order to adjust brittleness and sliding properties during sharpening it is advantageous for the at least one inorganic filler to be selected from the group of fillers comprising layer-lattice silicates, calcium sulphate, calcium carbonate, boron nitride, soapstone and graphite.

In order to achieve special properties and to satisfy specific requirements, it is advantageous for the at least one additive to be selected from the group of additives comprising lubricants, plasticisers, surface-active substances, heat stabilisers and UV stabilisers.

Two example formulations for the wood substitute material that have proven to be effective are shown below:

EXAMPLE FORMULATION 1

| | |
|---|---|
| Polyethylene high-density (PEHD) | 25.0% by weight |
| Wood dust | 65.0% by weight |
| Polyethylene with grafted maleic anhydride | 2.0% by weight |
| Amide wax | 3.0% by weight |
| Stearic acid | 3.0% by weight |
| Titanium dioxide | 2.0% by weight |

EXAMPLE FORMULATION 2

| | |
|---|---|
| Polypropylene (PP) | 20.0% by weight |
| Wood dust | 70.0% by weight |
| Polypropylene with grafted maleic anhydride | 1.0% by weight |
| Amide wax | 3.0% by weight |
| Stearic acid | 1.0% by weight |
| Boron nitride | 5.0% by weight |

The use of a wood substitute material according to the invention for the production of wood-encased pencils, in particular lead pencils or colour pencils or cosmetic pencils that comprise a colour-releasing lead and a wood sheathing for the lead is ideal, the wood sheathing being replaced by a sheathing made of the wood substitute material is ideal. In this instance leads are particularly used that have a polymer bond.

Furthermore, a use of a wood substitute material according to the invention for the production of wood-encased pencils that comprise a lead made of an eraser material and a wood sheathing for the lead is ideal, the wood sheathing being replaced by a sheathing made of the wood substitute material.

When forming pencils with colour-releasing leads or leads made of an eraser material it is particularly preferred for the sheathing to be formed from the wood substitute material by extrusion. In particular the leads are also formed by extrusion. Extrusion is a continuous production method and is therefore particularly suitable for the cost-effective mass production of pencils.

A pencil that has a casing made of a polymer-bonded wood substitute material and a polymer-bonded lead may, in particular, be produced in a co-extrusion method. The lead and the envelope are shaped in-situ in an extruder and produced together via a nozzle as a continuous strand in the respective desired geometry, the strand merely then having to be divided into individual pencils.

A further possibility lies in sheathing a lead that is already provided, this also possibly being achieved by extrusion.

Extrusion methods pose the advantage that virtually all cross-sectional geometries of pencils can be produced.

The invention claimed is:

1. A wood substitute material for wood-encased pencils, including the following ingredients:
   15 -30% by weight of at least one polymeric binder;
   50 -80% by weight of at least one organic filler;
   0 -20% by weight of at least one inorganic filler;
   0.5 -5% by weight of at least one adhesion promoter;
   1 -30% by weight of at least one wax;
   0 -10% by weight of at least one colour pigment; and
   0 -10% by weight of at least one additive,
   Wherein the at least one adhesion promoter forms a chemical bond between the at least one polymeric binder and the at least one organic filler, wherein a ratio of the at least one adhesion promoter to the at least one wax in a range from 1:2.5 to 1:6, in % by weight, being formed, and a sum of organic and inorganic filler being not more than 80% by weight, and wherein the at least one organic filler is formed of filler particles having a maximum particle size of 100 µm.

2. The wood substitute material according to claim 1, wherein the ratio of the at least one adhesion promoter to the at least one wax is formed in the range from 1:2.5 to 1:4.5.

3. The wood substitute material according to claim 1, including
   20- 25% by weight of at least one polymeric binder,
   65- 75% by weight of at least one organic filler,
   1- 5% by weight of at least one inorganic filler,
   1- 2% by weight of at least one adhesion promoter,
   2- 12% by weight of at least one wax,
   1- 4% by weight of at least one colour pigment, and
   0- 5% by weight of at least one additive.

4. The wood substitute material according to claim 1, wherein the at least one wax is selected from the group of waxes consisting of amide waxes, fatty acids, montanic wax, stearates, fatty acid esters and paraffin wax.

5. The wood substitute material according to claim 4, wherein the fatty acids are stearic acid or palmitic acid.

6. The wood substitute material according to claim 4, wherein the at least one wax is formed of amide wax and/or stearic acid.

7. The wood substitute material according to claim 6, wherein the at least one wax is formed of a combination of amide wax and stearic acid, a ratio of amide wax to stearic acid lying in a range from 1:0.5 to 1:2.

8. The wood substitute material according to claim 1, wherein the at least one polymeric binder is selected from the group of polyolefins.

9. The wood substitute material according to claim 8, wherein the at least one polymeric binder is formed of polyethylene (PE) and/or polypropylene (PP).

10. The wood substitute material according to claim 9, wherein the at least one polymeric binder is formed of polyethylene high-density (PEHD).

11. The wood substitute material according to claim 8, wherein the at least one adhesion promoter is formed by a polyethylene (PE) with grafted maleic anhydride.

12. The wood substitute material according to claim 8, wherein the at least one adhesion promoter is formed by a polypropylene (PP) with grafted maleic anhydride.

13. The wood substitute material according to claim 8, wherein the at least one adhesion promoter is formed by an ethylene maleic anhydride copolymer with maleic anhydride-grafted metallocene polyethylene wax.

14. The wood substitute material according to claim 1, wherein the at least one organic filler is formed of wood and/or cellulose.

15. The wood substitute material according to claim 1, further including 1 to 3% by weight of white colour pigment.

16. The wood substitute material according to claim 15, wherein the white colour pigment is formed of titanium dioxide ($TiO_2$).

17. The wood substitute material according to claim 1, further including 0.1 to 5% by weight of coloured colour pigment.

18. The wood substitute material according to claim 1, wherein the at least one inorganic filler is selected from the group of fillers consisting of layer-lattice silicates, calcium sulphate, calcium carbonate, boron nitride, soapstone and graphite.

19. The wood substitute material according to claim 1, wherein the at least one additive is selected from the group of additives consisting of lubricants, plasticizers, surface-active substances, heat stabilizers and UV stabilizers.

20. A method for producing encased pencils using a wood substitute material according to claim 1, the method comprising the steps of: providing a colour-releasing lead; and sheathing the lead with the wood substitute material.

21. A method for producing encased pencils using a wood substitute material according to claim 1, the method comprising the steps of: providing a lead made of an eraser material; and sheathing the lead with the wood substitute material.

22. The method according to claim 20, wherein the sheathing is formed from the wood substitute material by extrusion.

* * * * *